Patented Aug. 29, 1950

2,520,472

UNITED STATES PATENT OFFICE 2,520,472

5-PHENACYLPYRIMIDINES AND METHOD OF PREPARING SAME

Barbara Roth, Middlesex, N. J., assignor to American Cyanamid Company, New York, N. Y., a corporation of Maine No Drawing. Application February 10, 1948, Serial No. 7,525

6 Claims. (Cl. 260—247)

1

The present invention relates to new organic compounds and to methods of preparing the same.

The new compounds of the present invention may be illustrated by the following general formula:

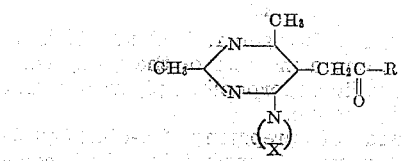

in which R is an aromatic radical of the benzene series and X represents the atoms necessary to complete the ring of a secondary heterocyclic amine. The acid salts of these compounds are also included within the scope of the invention.

The compounds are generally characterized by being crystalline solids, the free bases being soluble in organic solvents such as benzene, diethyl ether, and the like, but being insoluble in water. The acid salts are soluble in water and alcohols but are insoluble in ether or benzene. Some of the compounds are useful as intermediates in the preparation of pharmaceuticals and other organic compounds.

The compounds of the present invention may be prepared by the reaction of a heterocyclic secondary amine with a 2,4-dimethyl-5-phenacyl-6-halopyrimidine dissolved or suspended in an anhydrous, inert organic liquid, or an excess of the heterocyclic secondary amine if a liquid, at the temperature of the reaction. The product may be recovered as the free base or as one of its acid salts.

Suitable 2,4-dimethyl-5-phenacyl-6-halopyrimidines which may be used in the preparation of the new compounds include 2,4-dimethyl-5-phenacyl-6-chloropyrimidine; 2,4 - dimethyl-5-phenacyl-6-bromopyrimidine, etc. The aryl radical R of the general formula may contain substituent radicals such as chlorine, bromine, methyl, methoxy, nitro, carbethoxy, and the like.

Suitable heterocyclic secondary amines which can be reacted with the foregoing 2,4-dimethyl-5-phenacyl-6-halopyrimidines include piperidine, piperazine, morpholine, thiomorpholine, tetrahydroisoquinoline, thiazoline, pyrrolidine, and the like.

The reaction is preferably conducted in an inert anhydrous organic solvent such as benzene, diethyl ether, dibutyl ether, toluene, chloroform, isopropyl acetate or an excess of the heterocyclic secondary amine, when this is a liquid, at the temperature of the reaction.

2

Preferably the reaction is conducted at a temperature of 40° to 80° C., although the reaction can be carried out at from about 20° C. to 100° C. The reaction is completed in a shorter time if carried out at the higher temperatures up to 100° C.

As a halogen acid is formed as a result of the reaction, the acid will tend to react with the secondary amine. The salts of the secondary amine that are formed may be insoluble in the reaction solvent and when this is so the rate of salt formation will indicate the progress of the reaction. When no more salt is formed the reaction may be considered complete.

The invention will now be illustrated in greater detail by means of the following example in which a representative 2,4-dimethyl-5-phenacyl-6-halopyrimidine is reacted with a representative secondary heterocyclic amine to produce a new compound of the present invention. Obviously, this example is intended to be illustrative and is not intended to restrict the invention to the particular product or reaction conditions described. All parts are by weight unless otherwise indicated.

Example

A mixture of 515 g. phenacylacetoacetic ester, 197 g. acetamidine hydrochloride, 84 g. sodium hydroxide pellets dissolved in 830 ml. of water, and 100 ml. of 95% ethyl alcohol is stirred at room temperature for one-half hour, after which it is allowed to stand without stirring for two days. A thick crystalline mass forms, which is filtered off and washed well with water. Upon recrystallization from alcohol, 80 g. of 2,4-dimethyl-5-phenacyl-6-hydroxypyrimidine, a white crystalline compound is obtained, which upon further recrystallization from ethanol melts at 211°–212° C. Additional product is obtained when the mother liquor stands for some time.

A mixture of 106 g. of 2,4-dimethyl-5-phenacyl-6-hydroxypyrimidine and 265 ml. of phosphorus oxychloride is heated for an hour on the steam bath. The excess phosphorus oxychloride is distilled off under vacuum, and the residue drowned in ice and neutralized with sodium bicarbonate. A tan precipitate forms, which after filtering and drying, weighs 111 g. Upon recrystallization from petroleum ether (B. P. 125°–145° C.), which serves to separate the product from some insoluble impurities, 82 g. of 2,4-dimethyl-5-phenacyl-6-chloropyrimidine is obtained, melting at 103.5°–104.5° C.

A mixture of 60 g. of 2,4-dimethyl-5-phenacyl-6-chloropyrimidine and 70 ml. of piperidine is warmed on the steam bath until an exothermic reaction takes place. Cooling is then necessary for a few moments to keep the reaction under control, after which it is heated for an additional 15 minutes on the steam bath to complete the reaction. The mixture is then cooled, and sufficient benzene added to make a workable slurry. It is then filtered from piperidine hydrochloride, the precipitate washed well with benzene, and the benzene solution extracted with an excess of dilute hydrochloric acid. Upon clarification and neutralization of the acid extracts, a gummy precipitate is formed, which soon solidifies, and after filtering and drying, weighs 68.6 g. Upon recrystallization from petroleum ether, the product 2,4 - dimethyl - 5 - phenacyl - 6 - (1 - piperidyl) - pyrimidine melts at 87°–89° C.

The above compound can be converted to the hydrochloride salt in ether, by the addition of exactly one equivalent of ethereal hydrogen chloride. Upon recrystallization from alcohol-ether, the hydrochloride salt has a melting point of 200°–201° C.

I claim:

1. Compounds having the following general formula:

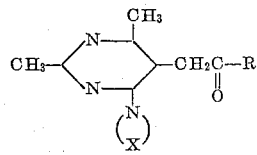

in which R is selected from the group consisting of phenyl, chlorophenyl, bromophenyl and anisyl radicals and

represents a secondary heterocyclic amine selected from the group consisting of piperidyl, morpholinyl, piperazinyl and tetrahydroisoquinilyl radicals.

2. A method of preparing compounds having the general formula:

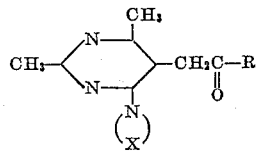

in which R is selected from the group consisting of phenyl, chlorophenyl, bromophenyl and anisyl radicals and

represents a secondary heterocyclic amine selected from the group consisting of piperidyl, morpholinyl, piperazinyl and tetrahydroisoquinolyl radicals, which comprises mixing together an inert anhydrous organic liquid, a compound having the formula:

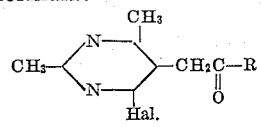

in which Hal. is a halogen radical and R is as defined above, and a member of the group consisting of piperidine, morpholine, piperazine and tetrahydroisoquinoline.

3. A method of preparing 2,4-dimethyl-5-phenacyl-6-(1-piperidyl) pyrimidine which comprises mixing together 2,4-dimethyl-5-phenacyl-6-chloropyrimidine and an excess of piperidine.

4. 2,4 - dimethyl - 5 - phenacyl - 6 - (1 - piperidyl) pyrimidine.

5. 2,4 - dimethyl - 5 - phenacyl - 6 - (1 - piperazyl) pyrimidine.

6. 2,4 - dimethyl - 5 - phenacyl - 6 - (N - morpholyl) pyrimidine.

BARBARA ROTH.

No references cited.